United States Patent Office 2,796,619
Patented June 25, 1957

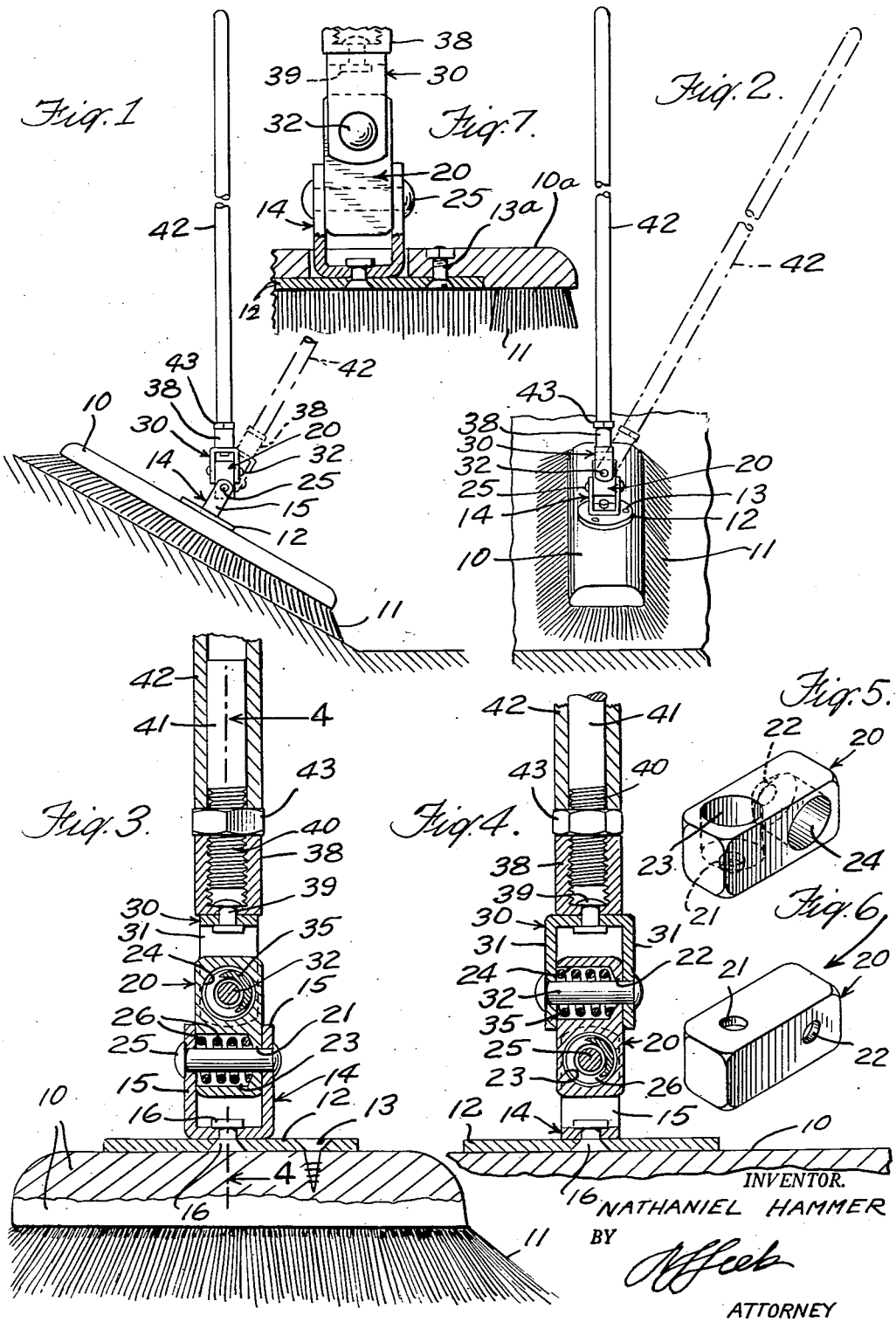

2,796,619

BRUSH HAVING UNIVERSALLY CONNECTED HANDLE

Nathaniel Hammer, Brooklyn, N. Y., assignor to American Uniform Co., Cleveland, Tenn., a corporation of Minnesota Application November 28, 1955, Serial No. 549,355

1 Claim. (Cl. 15—172)

This invention relates to floor brushes or the like and has for an object to provide a universal connector for the handles of such brushes.

Another object is to provide a universal connector for brush handles having novel and improved details of construction and features of operation.

Another object is to provide a connector of the above type which is adapted to hold the handle in any selected position but to permit the angular position of the handle with respect to the brush to be varied as desired for brushing in corners or around objects.

Various other objects and advantages will be apparent as the nature of the invention is more fully disclosed.

The invention will be better understood by referring to the following description, taken in connection with the accompanying drawing in which a specific embodiment thereof has been set forth for purposes of illustration.

In the drawings:

Fig. 1 is a perspective view of a floor brush and handle embodying the present invention and showing an alternate position of the handle in broken lines;

Fig. 2 is an end elevation with the brush shown in perspective and showing an alternate position of the handle in broken lines;

Fig. 3 is an enlarged section through the connector;

Fig. 4 is a section taken on the line 4—4 of Fig. 3;

Fig. 5 is a perspective view of the connector block showing the sockets for receiving the friction springs;

Fig. 6 is a similar perspective view of the connector block showing the openings for the hinge rivets; and Fig. 7 is a detail view showing a further embodiment of the invention.

In the various figures of the drawing like parts are designated by like reference characters.

Referring to the drawing more in detail the brush is shown as comprising an elongated head 10 having bristles 11 carried therein and extending downwardly and outwardly therefrom. A connector plate 12 is attached to the head 10 by means shown as screw 13. A U-shaped bracket 14 having upstanding flanges 15 is secured to the connector plate 12 by a rivet 16.

A connector block 20 is formed with a pair of bores 21 and 22 having axes displaced by 90°, which are enlarged at one end to form recesses 23 and 24 respectively. The block 20 is pivotally secured between the upstanding flanges 15 of the bracket 14 by means of a hinge rivet 25 which extends through the opening 21 and through the recess 23 and is adapted to permit pivotal movement of the block 20 with respect to said bracket 14. A compression spring 26 is disposed in the recess 23 about the rivet 25 and is adapted to exert pressure between the block 20 and one of the flanges 15 suited to provide a friction drag for holding the block 20 in selected angular positions.

A bracket 30, similar to the bracket 14, is provided with downwardly extending flanges 31 which are disposed on opposite sides of the block 20 in alignment with the bore 22 and are secured by a hinge rivet 32 extending through the flanges 31 and through the bore 22 and the aligned recess 24. A compression spring 35 is disposed in the recess 24 around the hinge rivet 32 for exerting a frictional drag similar to that produced by the compression spring 26 above described. The connection is such that the bracket 30 is free to turn around the axis of the hinge rivet 32 but is held in adjusted position by the frictional drag produced by the compression spring 35.

A coupling socket 38 is connected to the bracket 30 by means of a rivet 39. This coupling socket 38 is adapted to receive the threaded end 40 of a pin 41 which is secured to a handle 42 and is provided with a lock nut 43 by means of which the handle 42 is secured.

In the embodiment of Fig. 7 the plate 12 is disposed on the under side of the brush head 10a, and is secured thereto by bolts 13a with the bracket 14 extending upwardly through a bore in said head. This construction may be employed where the shape of the head 10a provides sufficient space for the plate 12 within the confines of the bristles 11.

The above described arrangement permits free turning of the handle about two axes disposed at an angle of 90° so as to provide a universal movement between the handle 42 and the brush head 10. At the same time the friction drag introduced by the compression springs 26 and 35 serves to hold the brush and handle in any selected position during the brushing operation. This permits the brush angle to be shifted to various positions as required during use to facilitate brushing in corners or around objects or walls. The handle can easily be replaced by loosening the lock nut 43.

The invention is particularly applicable to long brushes of the type shown and described but may also be applied to other types of brushes and to other uses as will be apparent to a person skilled in the art.

What is claimed is:

A brush comprising an elongated head carrying bristles, a U-shaped bracket secured to said head having a pair of upstanding flanges, a connector block having an end disposed between said flanges, a hinge pin pivotally securing said block to said flanges, a second U-shaped bracket having a pair of flanges spanning the other end of said block, a hinge pin pivotally securing the flanges of said second bracket to said block and disposed with its axis displaced by 90° with respect to said first hinge pin, said block having a recess around each of said hinge pins extending a portion only of the distance through said block and having an inner end wall, a compression spring in each of said recesses bearing at one end against said end wall and at the other end against one flange of each of said pairs to cause the other flange of each of said pairs to exert a friction drag against the surface of said block, and a socket to receive a brush handle secured to said second bracket.

References Cited in the file of this patent

UNITED STATES PATENTS

| 203,208 | Spalding | Apr. 30, 1878 |
|---|---|---|
| 1,787,970 | Bertola | Jan. 6, 1931 |
| 2,038,697 | Winslow | Apr. 28, 1936 |
| 2,636,759 | Rueb | Apr. 28, 1953 |

FOREIGN PATENTS

| 23,715 | Great Britain | of 1914 |